United States Patent
Kim et al.

(10) Patent No.: US 10,928,497 B2
(45) Date of Patent: Feb. 23, 2021

(54) WIDEBAND PULSE DETECTOR AND METHOD FOR OPERATING THE SAME

(71) Applicant: ELECTRONICS AND TELECOMMUNICATIONS RESEARCH INSTITUTE, Daejeon (KR)

(72) Inventors: Dong-Min Kim, Daejeon (KR); Huirae Cho, Sejong-si (KR); Ki-Baek Kim, Daejeon (KR); Minseok Yoon, Daejeon (KR); Sang-Kyu Kim, Daejeon (KR); Seung-Kab Ryu, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/397,194

(22) Filed: Apr. 29, 2019

(65) Prior Publication Data
US 2020/0217941 A1    Jul. 9, 2020

(30) Foreign Application Priority Data
Jan. 7, 2019    (KR) .................. 10-2019-0001772

(51) Int. Cl.
*G01S 13/02*    (2006.01)
*G01S 7/285*    (2006.01)

(52) U.S. Cl.
CPC .......... *G01S 13/0209* (2013.01); *G01S 7/285* (2013.01)

(58) Field of Classification Search
CPC ..................................... H03K 5/19
(Continued)

(56) References Cited

U.S. PATENT DOCUMENTS

| | | | | |
|---|---|---|---|---|
| 5,621,414 A | * | 4/1997 | Nakagawa | G01S 5/14 342/350 |
| 6,075,782 A | * | 6/2000 | Mizumoto | H04J 3/16 370/347 |

(Continued)

FOREIGN PATENT DOCUMENTS

| | | |
|---|---|---|
| JP | 08-018429 A | 1/1996 |
| JP | 2014-523535 A | 9/2014 |

(Continued)

OTHER PUBLICATIONS

David Blake Jackson et al., "High Dynamic Range, Wide Bandwidth Electromagnetic Field Threat Detector," Ultra-Wideband, Short-Pulse Electro-magnetic 10. Springer New York, 2014.

*Primary Examiner* — Shuwang Liu
*Assistant Examiner* — Gina M McKie
(74) *Attorney, Agent, or Firm* — LRK Patent Law Firm

(57) ABSTRACT

A wideband pulse detector and a method for operating the wideband pulse detector. The wideband pulse detector includes a signal collection unit for receiving electromagnetic pulses, a signal classification unit for classifying the electromagnetic pulses into N channels (where N is an integer of 2 or more) depending on frequency components corresponding to the electromagnetic pulses, a signal detection unit for detecting and holding the classified pulses, and a signal processing unit for converting the held pulses into digital signals, identifying types of the electromagnetic pulses corresponding to the converted digital signals using a classification algorithm, determining signal strengths of the electromagnetic pulses, and then controlling a reset circuit for successive signal detection.

15 Claims, 6 Drawing Sheets

(58) Field of Classification Search
USPC .......................................................... 375/130
See application file for complete search history.

(56) References Cited

U.S. PATENT DOCUMENTS

| | | | |
|---|---|---|---|
| 7,129,884 B1 | 10/2006 | Tehrani et al. | |
| 8,773,107 B2* | 7/2014 | Jackson | G01R 29/0814 |
| | | | 324/72 |
| 8,803,730 B2 | 8/2014 | Jiang | |
| 8,838,017 B2 | 9/2014 | Muthali et al. | |
| 8,860,402 B2 | 10/2014 | Jackson et al. | |
| 2005/0053165 A1* | 3/2005 | Lakkis | H04B 1/71637 |
| | | | 375/260 |
| 2005/0058210 A1* | 3/2005 | Berger | H04B 1/69 |
| | | | 375/259 |
| 2005/0069059 A1* | 3/2005 | Krivokapic | H04B 1/71637 |
| | | | 375/340 |
| 2005/0286626 A1* | 12/2005 | Chou | H04L 25/03019 |
| | | | 375/232 |

FOREIGN PATENT DOCUMENTS

| | | |
|---|---|---|
| KR | 10-0990538 B1 | 10/2010 |
| KR | 10-2013-0005692 A | 1/2013 |
| KR | 10-1367882 B1 | 2/2014 |

* cited by examiner

OUTPUT SIGNAL OF SIGNAL DETECTION UNIT
(WHEN NO RESET CIRCUIT IS PRESENT)

OUTPUT SIGNAL OF SIGNAL DETECTION UNIT
(WHEN RESET CIRCUIT IS OPERATED)

WIDEBAND PULSE DETECTOR AND METHOD FOR OPERATING THE SAME

CROSS REFERENCE TO RELATED APPLICATION

This application claims the benefit of Korean Patent Application No. 10-2019-0001772, filed Jan. 7, 2019, which is hereby incorporated by reference in its entirety into this application.

BACKGROUND OF THE INVENTION

1. Technical Field

The present invention relates to a wideband pulse detector and a method for operating the wideband pulse detector.

2. Description of the Related Art

Generally, a pulse denotes a wave motion in which a large amplitude is instantaneously generated within a short period of time. Such a pulse may cause an unexpected overcurrent in an electronic device, thus resulting in permanent breakdown of the electronic device. In the modern age, in which communication is mainly performed using electronic devices, such as mobile phones or computers, such paralysis of electronic devices may cause great social chaos, and thus it is important to minimize damage to electronic devices by immediately detecting and responding to pulses. Generally, a wideband pulse detector may detect the presence of electromagnetic signals in a free space.

PRIOR ART DOCUMENTS

Patent Documents (Patent Document 1) Korean Patent No. 10-0990538, Date of Registration: Oct. 21, 2010, Title: Method and Apparatus for Radar Pulse Detection and Estimation in Wireless LAN physical layer (Patent Document 2) Korean Patent No. 10-1367882, Date of Registration: Feb. 20, 2014, Title: Wideband Jammer Detector Comprising Peak Detector

Non-Patent Documents (Non-Patent Document 1) David Blake Jackson, and two others, "High Dynamic Range, Wide Bandwidth Electromagnetic Field Threat Detector" Ultra-Wideband, Short-Pulse Electro-magnetic 10. Springer New York, 2014, pp. 355-368

SUMMARY OF THE INVENTION

Accordingly, the present invention has been made keeping in mind the above problems occurring in the prior art, and an object of the present invention is to provide a low-cost, efficient wideband pulse detector, which is located in equipment or a device, or facility that can be exposed to and damaged by an arbitrary electromagnetic pulse and which is configured to detect and identify the corresponding electromagnetic pulse and to perform monitoring/warning, and a method for operating the wideband pulse detector.

In accordance with an aspect of the present invention to accomplish the above object, there is provided a wideband pulse detector, including a signal collection unit for receiving electromagnetic pulses, a signal classification unit for classifying the electromagnetic pulses into N channels (where N is an integer of 2 or more) depending on frequency components corresponding to the electromagnetic pulses, a signal detection unit for detecting and holding the classified pulses, and a signal processing unit for converting the held pulses into digital signals, identifying types of the electromagnetic pulses corresponding to the converted digital signals using a classification algorithm, and determining strengths of the electromagnetic pulses.

In an embodiment, the signal collection unit may include an antenna for receiving the electromagnetic pulses; and an equalizer for compensating for a frequency response of the antenna.

In an embodiment, the signal classification unit may include a divider for dividing the electromagnetic pulses from the signal collection unit into a signal strength measurement path and a signal identification path; N−1 couplers for receiving the electromagnetic pulses from the signal collection unit; and filters for receiving respective outputs of the couplers while having different frequency bands.

In an embodiment, the signal detection unit may include a first signal detector for receiving outputs of the divider and measuring signal strengths of the outputs; and one or more signal detectors for receiving respective outputs of the filters and identifying types of the signals.

In an embodiment, the signal detection unit may include signal detectors corresponding to N channels, and each of the signal detectors may include an envelope detector for detecting a corresponding electromagnetic pulse; and a peak-holding circuit for holding a signal output from the envelope detector.

In an embodiment, each of the signal detectors may further include a successive signal detection circuit for resetting an output of the peak-holding hold circuit to a ground under of the signal processing unit.

In an embodiment, the wideband pulse detector may further include a dynamic range compensation and equipment protection circuit for connecting an attenuator to a corresponding signal detector under control of the signal processing unit.

In an embodiment, the wideband pulse detector may further include a self-diagnosis circuit for determining whether a corresponding signal detector fails or is operated normally under control of the signal processing unit.

In an embodiment, the wideband pulse detector may further include a signal display unit for displaying the types of the electromagnetic pulses identified by the signal processing unit and strengths of the electromagnetic pulses.

In an embodiment, the wideband pulse detector may further include a power supply unit for rectifying power and supplying the rectified power to the signal classification unit, the signal detection unit, and the signal processing unit.

In accordance with another aspect of the present invention to accomplish the above object, there is provided a method for operating a wideband pulse detector, including detecting, by an envelope detector, a signal received from a corresponding one of filters for respective frequency bands; holding, by a peak-holding circuit, the signal detected by the envelope detector to perform digital sampling; and resetting, by a successive signal detection circuit, the held signal to a ground.

In an embodiment, the method may further include converting the held signal into a digital signal; and determining a type and a strength of an electromagnetic pulse corresponding to the converted digital signal.

In an embodiment, holding the detected signal may include holding, by the peak-holding circuit, the maximum voltage of the detected signal.

In an embodiment, the method may further include receiving an electromagnetic pulse through an antenna; and equalizing the received electromagnetic pulse.

In an embodiment, the method may further include filtering the equalized pulse for each frequency band.

BRIEF DESCRIPTION OF THE DRAWINGS

The following attached drawings are intended to help the understanding of the present embodiments, and the embodiments will be provided together with the detailed descriptions thereof. However, the technical features of the present embodiments are not limited to specific drawings, and features disclosed in individual drawings may be combined with each other to configure new embodiments.

DESCRIPTION OF THE PREFERRED EMBODIMENTS

Figure 1:
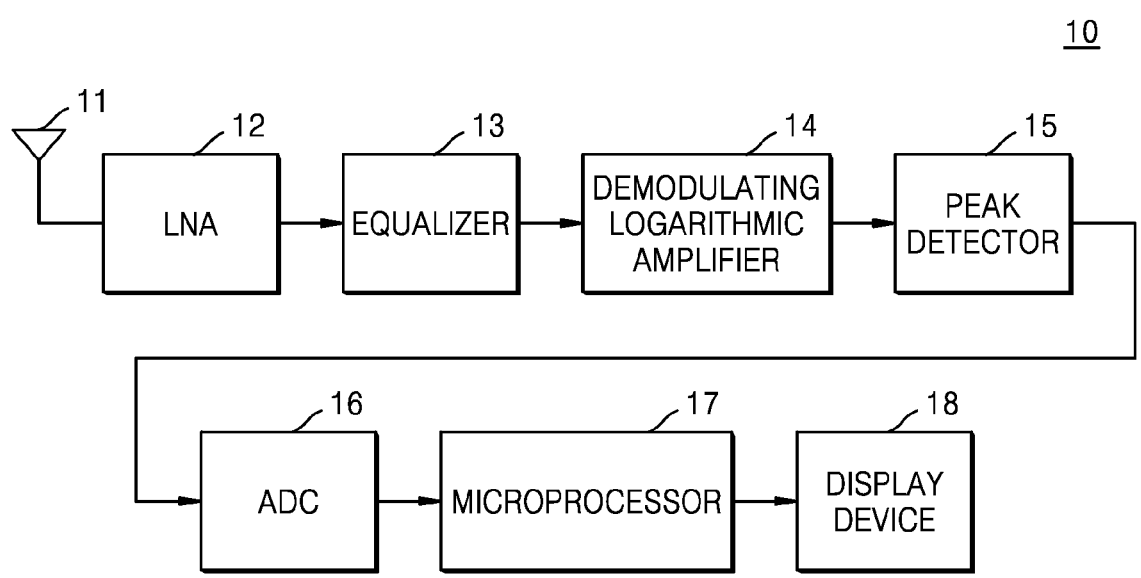
FIG. 1 is a diagram illustrating a typical pulse detector.

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various elements, these elements should not be limited by these terms.

These terms are only used to distinguish one element from another element. For instance, a first element discussed below could be termed a second element without departing from the teachings of the present invention. Similarly, the second element could also be termed the first element. It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Other expressions that explain the relationship between elements, such as "between", "directly between", "adjacent to" or directly adjacent to" should be construed in the same way. The terminology used herein is for the purpose of describing particular embodiments only and is not intended to be limiting. In the present invention, the singular forms are intended to include the plural forms as well, unless the context clearly indicates otherwise.

It should be further understood that the terms "comprise", "include", and "have" when used in this specification, specify the presence of stated features, integers, steps, operations, elements, components, and/or combinations of them but do not preclude the presence or addition of one or more other features, integers, steps, operations, elements, components, and/or combinations thereof. Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a diagram illustrating a typical pulse detector 10. Referring to FIG. 1, the pulse detector 10 includes a Low-Noise Amplifier (LNA) 12 corresponding to an antenna 11 for collecting electromagnetic pulses, an equalizer 13, a demodulating logarithmic amplifier 14, a peak detector 15, an Analog-to-Digital Converter (ADC) 16, a microprocessor 17, and a display device 18.

The equalizer 13 may compensate for the frequency response of the antenna 11. That is, a signal source having passed through the equalizer 13 exhibits flat frequency response characteristics. The demodulating logarithmic amplifier 14 may detect a Radio Frequency (RF) signal including a Continuous Wave (CW)-type carrier signal and then output the detected RF signal as a voltage signal proportional to a particular signal magnitude, and may detect even a signal having a pulse width of 10 ns or more. The peak detector 15 may be configured to capture a voltage signal proportional to a demodulated signal magnitude and hold the voltage signal to such an extent that the ADC 16 can capture the voltage signal. In order to detect a voltage signal proportional to a signal magnitude of about 10 ns, output from the demodulating logarithmic amplifier 14, and to sufficiently hold the voltage signal in accordance with the performance of the low-speed ADC 16, the peak detector 15 may detect a signal in two steps. That is, in a first step, a voltage proportional to the signal magnitude of a high-speed signal is detected, and in a second step, the detected signal is held for a long time to adapt to the low-speed ADC.

The microprocessor 17 may convert the signal, converted into a digital signal through the ADC 16, into an optical signal and transfer the optical signal to the display device 18, which is a graphical user interface (GUI). A system architecture may be designed to monitor various sites for abnormal electromagnetic activities. At each site, multiple detectors may be monitored.

Since the typical pulse detector 10 uses the demodulating logarithmic amplifier 14, it is impossible to accurately detect an RF signal not having a CW-type carrier signal. That is, the typical pulse detector 10 is capable of detecting only a narrowband signal in intentional electromagnetic interference (IEMI) (based on IEC 61000-4-36 standard, an ultra-wideband (UWB) source denotes a wideband signal, a damped sinusoid (DS) source denotes a midband signal, and a high power microwave (HPM) source denotes a narrowband signal), and is incapable of detecting or has difficulty in detecting fast transient signals corresponding to midband and wideband signals.

Also, the typical pulse detector 10 is capable of detecting only a signal, the rising time and pulse width of which are about 10 ns, and has difficulty in detecting signal sources, the pulse width of which is very small, for example, UWB signal sources (below several ns). Also, the typical pulse detector 10 can measure only signal strengths of electromagnetic signal sources and cannot identify the types of the signal sources. That is, it is impossible to distinguish the types of IEMI (UWB, DS, HPM) signal sources. Also, due to the absence of a successive signal detection circuit, the typical pulse detector 10 has difficulty in identifying a second signal source or a high-speed successive electromagnetic wave when the second signal source or the high-speed successive electromagnetic pulse appears while holding a detected signal.

The present invention proposes the structure of a low-cost, efficient wideband pulse detector, which is located in equipment, a device or facility that is exposed to an arbitrary electromagnetic pulse and can be damaged thereby and which can detect and identify the corresponding electromagnetic pulse to perform monitoring and warning. The structure of the detector proposed by the present invention may classify various types of wideband electromagnetic pulse signals and determine whether a successive electromagnetic wave is present, thus providing information beneficial in securing post evidence and responding to detected electromagnetic pulse signals.

Figure 2:
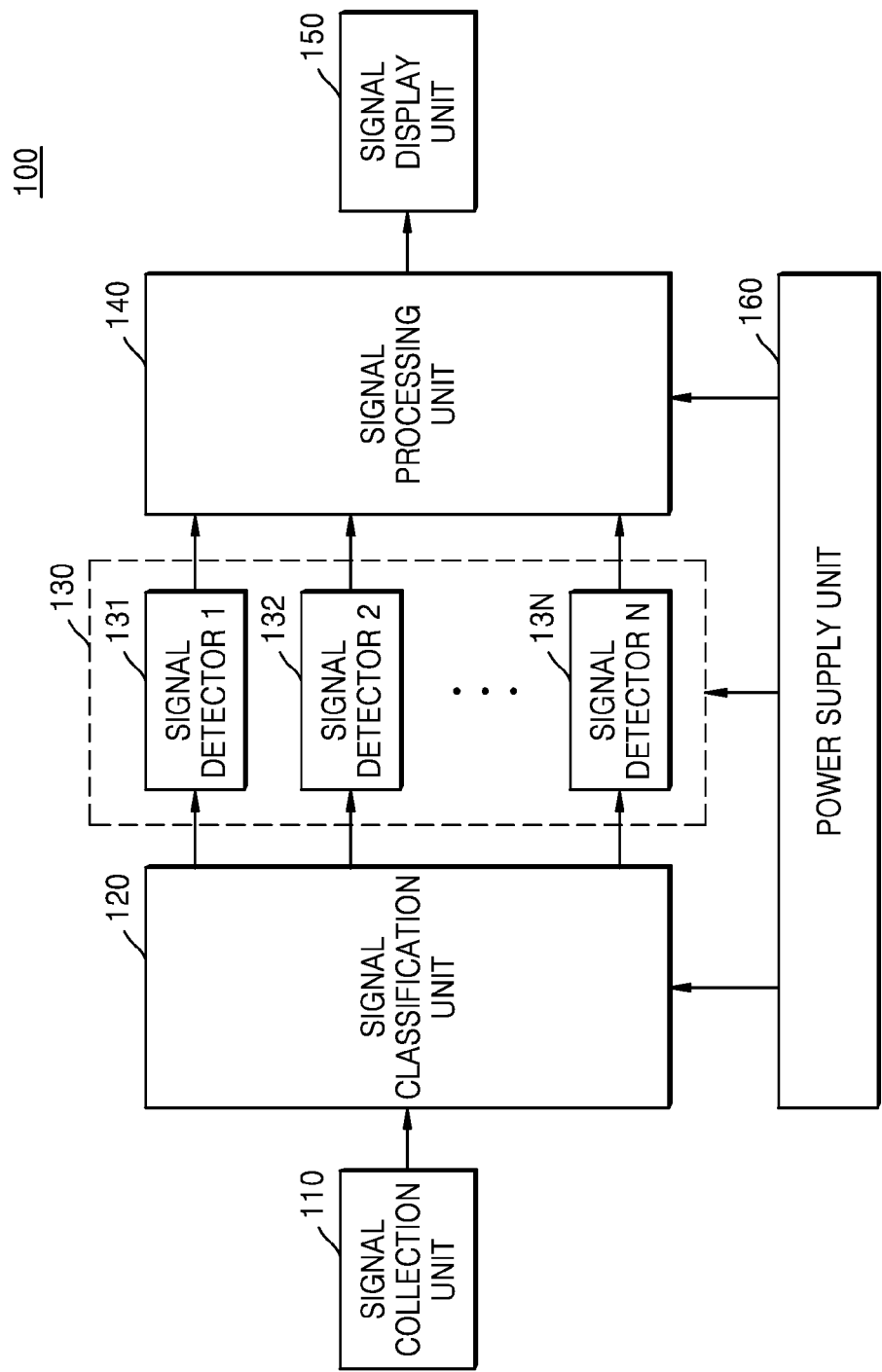
FIG. 2 is a diagram exemplarily illustrating a wideband pulse detector according to an embodiment of the present invention.

FIG. 2 is a diagram exemplarily illustrating a wideband pulse detector 100 according to an embodiment of the present invention. Referring to FIG. 2, the wideband pulse detector 100 may include a signal collection unit 110, a signal classification unit 120, a signal detection unit 130, a signal processing unit 140, a signal display unit 150, and a power supply unit 160.

The signal collection unit 110 may be configured to collect electromagnetic pulses using a wideband antenna. The signal collection unit 110 may include the wideband antenna which can receive electromagnetic pulses and an equalizer which can compensate for the frequency response of the antenna.

The signal classification unit 120 may be configured to classify the collected signals depending on frequency components. For example, the signal classification unit 120 may include an N-channel (where N is an integer of 2 or more) classifier for classifying the received electromagnetic pulses depending on desired frequency components.

The signal detection unit 130 may be configured to detect the strengths of the collected signals. The signal detection unit 130 may include multiple signal detectors 131, 132, . . . , 13N corresponding to N channels.

The signal processing unit 140 may be configured to identify the types of electromagnetic waves based on the classified signals. In an embodiment, the signal processing unit 140 may convert the detected and classified analog signals into digital signals, may identify the predefined types of electromagnetic pulses by applying a simple tree-based classification algorithm or deep learning-based classification algorithm to the digital signals, and may determine the strengths of the electromagnetic pulses. In an embodiment, the signal processing unit 140 may provide a communication interface for transferring the corresponding information to the signal display unit 150. The signal processing unit 140 may include an ADC, a microprocessor, an optical transceiver, an optical cable, etc. so as to perform related functions.

The signal display unit 150 may be configured to display detected signals. The signal display unit 150 may conveniently display the signal strengths and the identification information of detected wideband electromagnetic pulses to a user. Also, the signal display unit 150 may be connected to one or more detector terminals over a network, and may then remotely control the detector terminals in real time.

The power supply unit 160 may supply power to the internal components (e.g. the signal collection unit 110, signal classification unit 120, signal detection unit 130, signal processing unit 140, and signal display unit 150) of the wideband pulse detector 100. Further, the power supply unit 160 may generate power required for the entire system by rectifying the power, and may include a power filter or the like in order to minimize the influence of external electromagnetic pulses.

Figure 3:
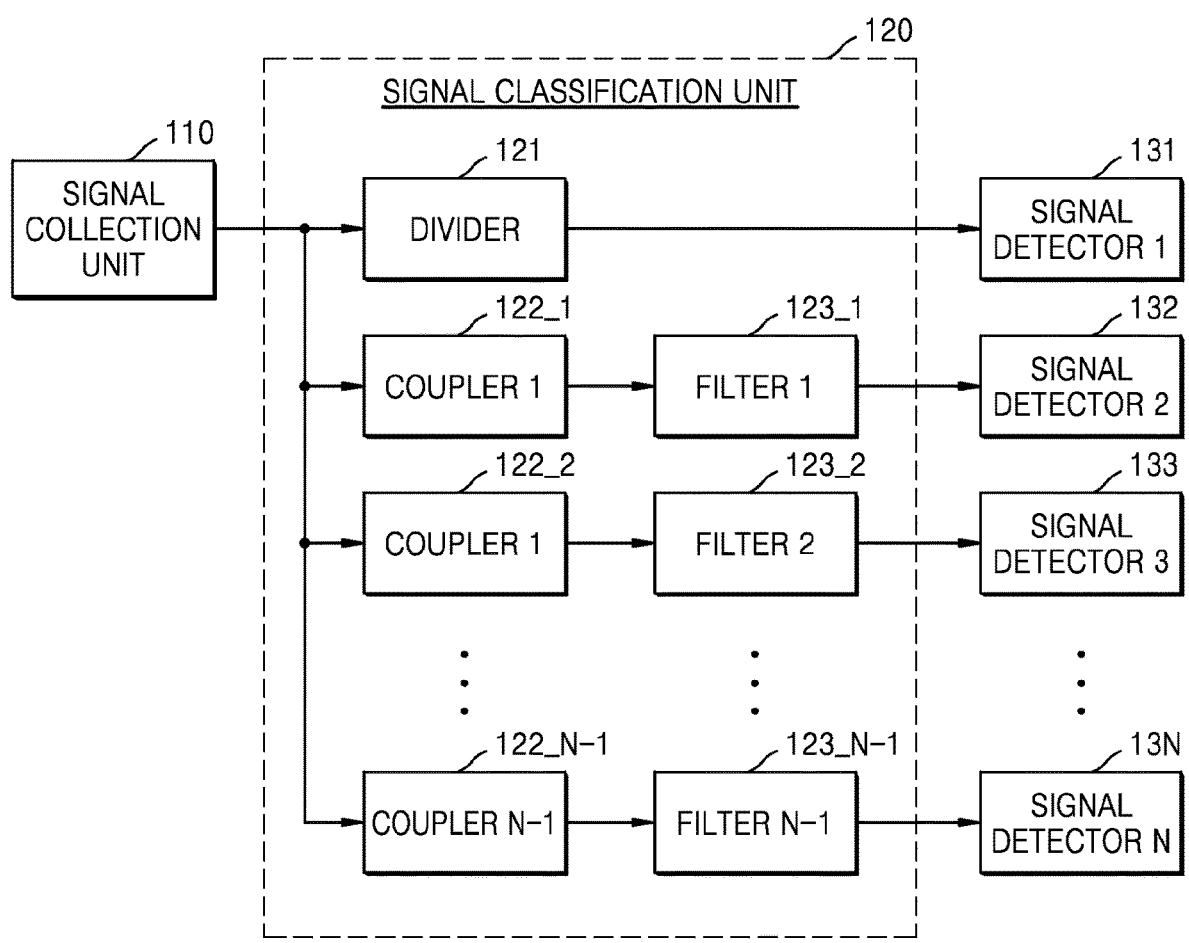
FIG. 3 is a diagram exemplarily illustrating a classifier according to an embodiment of the present invention.

FIG. 3 is a diagram exemplarily illustrating the signal classification unit 120 according to an embodiment of the present invention. Referring to FIG. 3, the signal classification unit 120 may include a divider 121, multiple couplers 122_1, 122_2, . . . , 122_N−1, and multiple filters 123_1, 123_2, . . . , 123_N−1 for respective frequency bands. The divider 121 may function to divide signal paths into a path for measuring the strengths of input signals and a path for identifying the types of the signals.

The signal classification unit 120 is configured such that a direct connection circuit, which measures the strengths of input signals, may be connected to the first signal detector 131 and such that the outputs of the filter circuits for respective bands, which identify the types of the input signals, may be connected to the remaining signal detectors 132, 133, . . . , and 13N, respectively.

The electromagnetic signals collected by the signal collection unit 110 may pass through the filters for respective frequency bands of the signal classification unit 120, and the signal detection unit 130 may identify the signal types by measuring the magnitudes of respective filter output signals and analyzing the frequency components thereof.

Each of the signal detectors 131, 132, 133, . . . , 13N of the signal detection unit 130 may employ an envelope detector, instead of a logarithmic amplifier (i.e. Log amp.) that is capable of accurately detecting only the types of CW-type carrier signals, such as HPM, thus enabling high-speed signal sources, the rising time and the pulse width of which are several ns, to be detected.

In an embodiment, each of the signal detectors 131, 132, 133, . . . , 13N of the signal detection unit 130 may include an envelope detector, which detects an electromagnetic pulse signal, the pulse width (several ns) of which is very small, and the rising time (several ns) of which is very short, and a peak-holding circuit, which enables low-speed digital sampling to be performed by holding the detected signal.

Figure 4:
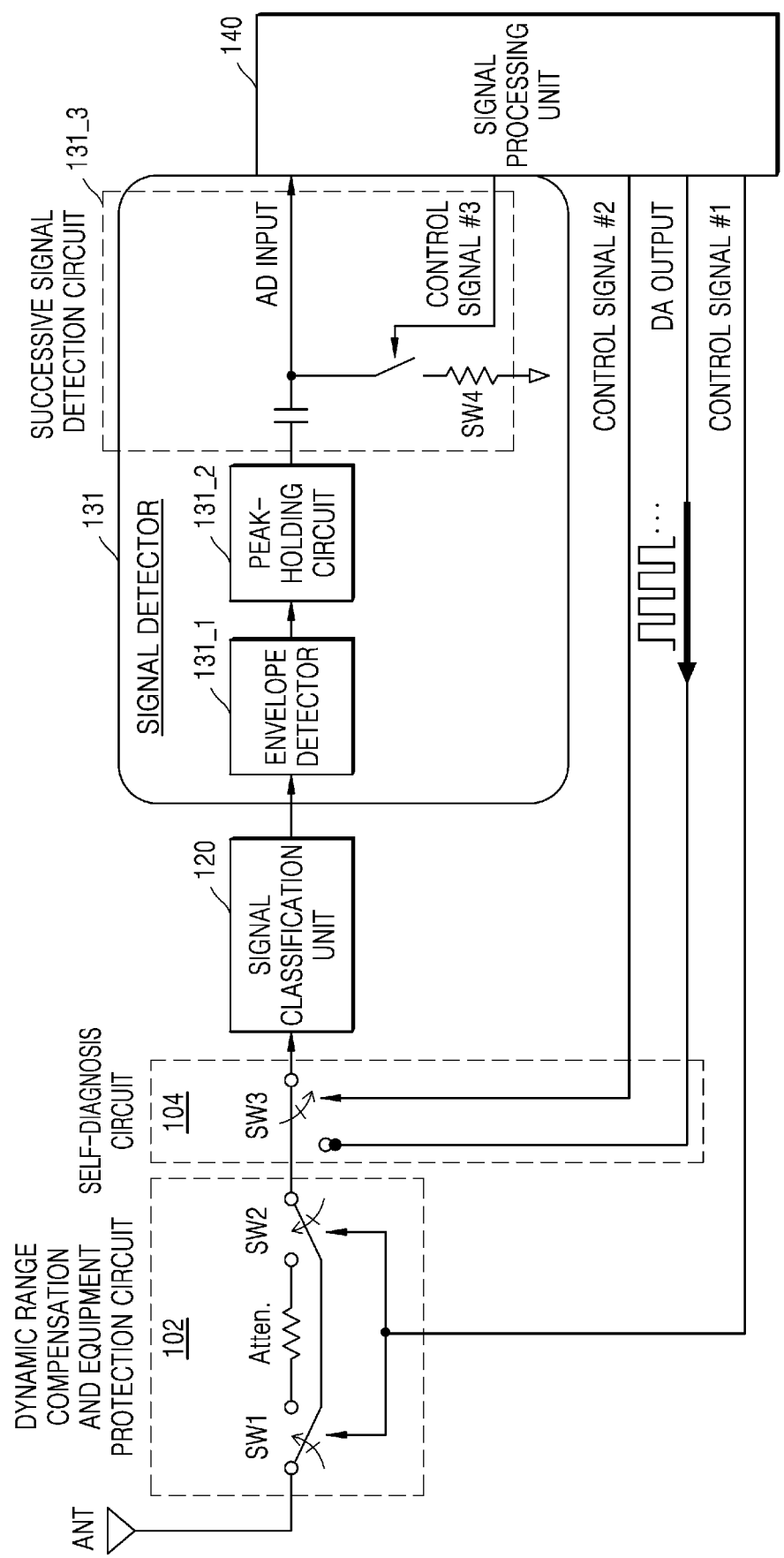
FIG. 4 is a diagram exemplarily illustrating a signal detector including a successive signal detection circuit, a dynamic range compensation and equipment protection circuit, and a self-diagnosis circuit according to an embodiment of the present invention.

FIG. 4 is a diagram exemplarily illustrating a signal detector 131 including a successive signal detection circuit, a dynamic range compensation and equipment protection circuit, and a self-diagnosis circuit according to an embodiment of the present invention. Referring to FIG. 4, the signal detector 131 may include an envelope detector 131_1, a peak-holding circuit 131_2, and a successive signal detection circuit 131_3.

Meanwhile, in order to reset a detected signal at high speed, as illustrated in FIG. 4, the signal detector 131 may include an RF switch SW4 connected in parallel to a stage subsequent to the peak-holding circuit 131_2 of the signal detector 131. When the signal processing unit 140 recognizes the presence of an electromagnetic pulse signal, the signal processing unit 140 may immediately generate a control signal #3, may perform an initialization (reset) operation of causing the output signal of the signal detector 131 to flow into a ground by turning on the switch SW4 in response to the control signal #3, and may prepare for the detection of a subsequent electromagnetic pulse signal.

Figure 5:
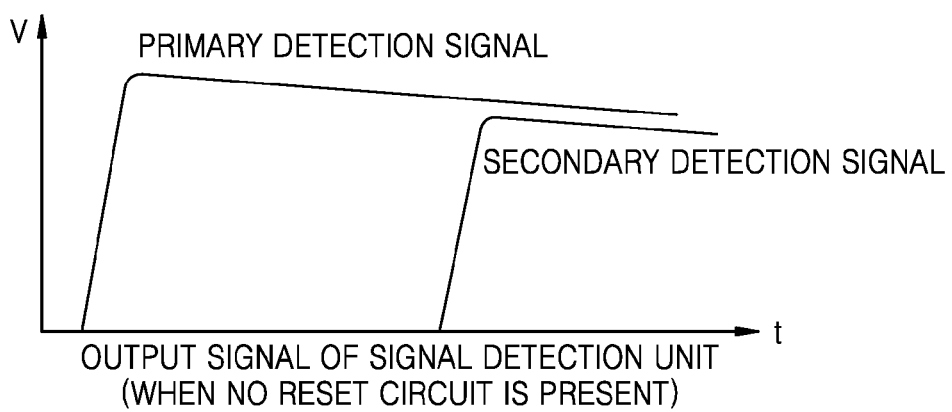
FIG. 5 is a diagram illustrating the operating effect of the successive signal detection circuit of the signal detection unit according to an embodiment of the present invention.
Figure 5:
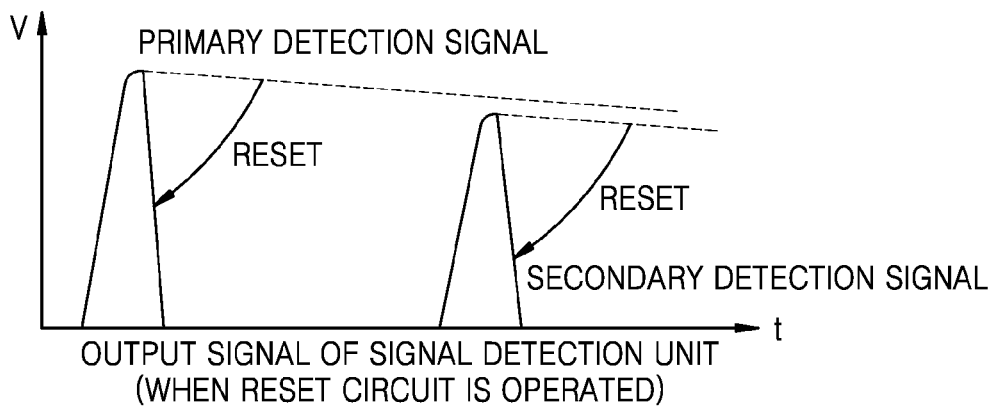

FIG. 5 is a diagram illustrating the operating effect of the successive signal detection circuit 131_3 of the signal detector according to an embodiment of the present invention. Referring to FIG. 5, in the case where no successive signal detection circuit is present, when a signal (secondary detection signal) having a level lower than that of a current detection result (primary detection signal) is continuously produced, the signal detector 131 neither recognizes nor identifies the successive signal. In contrast, when the successive signal detection circuit is operated, the signal detector 131 may individually recognize, identify and detect each signal.

As illustrated in FIG. 4, each of the signal detectors 131, 132, 133, . . . , 13N of the signal detection unit 130 may control an attenuator (Atten.) so as to compensate for a dynamic range and protect an RF element by employing the envelope detector 131_1, instead of a conventional logarithmic amplifier (Log amp.).

The maximum power rating of elements is fixed. Accordingly, when a voltage value having a certain level or more is detected by the signal processing unit 140, each of the signal detectors 131, 132, 133, . . . , 13N of the signal detection unit 130 may operate switches SW1 and SW2 in response to a control signal #1 output from the signal processing unit 140. When the switches SW1 and SW2 are operated, the attenuator is connected to the signal detector 131, thus enabling a signal having a high electric field intensity to be received while protecting elements provided in the equipment. Meanwhile, it should be understood that a configuration for element protection according to the present invention is not limited thereto. Instead of the switches, a digital step attenuator may also be used.

In order to determine whether the signal detector 131 fails or is operated normally, a self-diagnosis circuit 104 may be used, as illustrated in FIG. 4. The probability that an event desired to be detected by the present invention will occur is very low, but the signal detector 131 may always be located on a detection target and then be operated. In order to determine whether a failure occurs or an operation is performed normally during long-term operation of the signal detector 131, there may be difficulties such as disassembling equipment including the signal detector 131 and measuring the equipment using a measuring device. In order to solve the problem, the present invention may provide the self-diagnosis circuit 104 and an operating process thereof, which can autonomously and immediately determine whether an operation is performed normally. When the signal display unit remotely connected over the network or the like executes a self-diagnosis command, a switch SW3 is operated in response to a control signal #2 output from the signal processing unit 140, and thus a simple pulse is generated and is input to the signal classification unit. When signals are detected and classified in accordance with the input pulse signal, whether the operation is performed normally may be determined.

Figure 6:
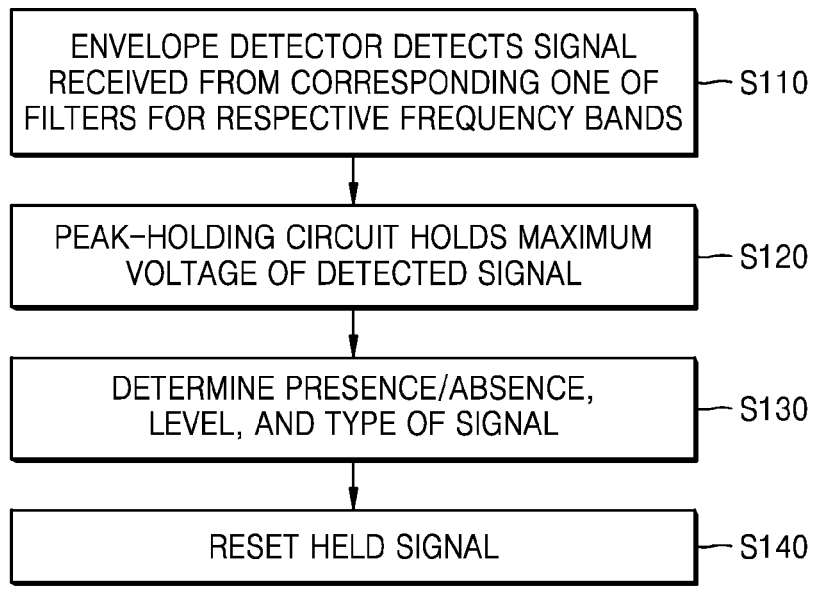
FIG. 6 is a flowchart exemplarily illustrating a method for operating a wideband pulse detector according to an embodiment of the present invention.

FIG. 6 is a flowchart exemplarily illustrating a method for operating the wideband pulse detector 100 according to an embodiment of the present invention. Referring to FIGS. 2 to 6, the method for operating the wideband pulse detector 100 may progress as follows.

An envelope detector (e.g. 131_1 of FIG. 4) may detect a signal received from a corresponding one of filters for respective frequency bands at step S110. A peak-holding circuit (e.g. 131_2 of FIG. 4) may hold the maximum voltage of the signal detected by the envelope detector 131_1 at step S120. After the signal held by the peak-holding circuit 131_2 has been received, the signal processing unit 140 may finally determine the presence or absence of a signal, the strength of the signal, and the type of the signal through a signal-processing procedure at step S130. Thereafter, in order to detect a subsequent signal, the signal held by the peak-holding circuit 131_2 may be reset at step S140.

In accordance with embodiments, some or all of steps and/or operations may be at least partially implemented or performed using instructions, programs, and interactive data structures stored in one or more non-transitory computer-readable media, and one or more processors for driving clients and/or servers. The one or more non-transitory computer-readable media may be, for example, software, firmware, hardware, and/or any combination thereof. Further, the function of "module" discussed in the present specification may be implemented using software, firmware, hardware, and/or any combination thereof.

One or more non-transitory computer-readable media and/or means for implementing/performing one or more operations/steps/modules in embodiments of the present invention may include, but are not limited to, Application-Specific Integrated Circuits (ASICs), standard integrated circuits, controllers including a microcontroller to execute suitable instructions and/or embedded controllers, Field-Programmable Gate Arrays (FPGAs), Complex Programmable Logic Devices (CPLDs), and the like.

The wideband pulse detector and the method for operating the wideband pulse detector according to embodiments of the present invention may secure wideband electromagnetic pulse signal detection technology that can exhibit detection performance (a rising time of several ns and a pulse width of several ns or more) superior to that of a conventional pulse detector and that can identify and distinguish various types of electromagnetic pulses (e.g. UWB, DS, HPM, etc.).

The wideband pulse detector and the method for operating the wideband pulse detector according to the embodiments of the present invention may individually identify and determine a successive signal or multiple signals when the successive signal is produced or when the multiple signals are produced (at intervals of several to several tens of kHz) using a detection and initialization (reset) scheme, thus collecting and providing a larger amount of information when wideband electromagnetic pulses are detected.

The wideband pulse detector and the method for operating the wideband pulse detector according to the embodiments of the present invention may remotely control a conventional sensor network-based control system while compatibly interacting with the conventional sensor network-based control system, and may support measures for preventing and responding to the damage caused by wideband electromagnetic pulses without requiring high-performance measuring equipment.

In accordance with the present invention, the wideband pulse detector and the method for operating the wideband pulse detector according to the embodiments of the present invention may identify various types of wideband electromagnetic pulse signals and determine the presence or absence of a successive electromagnetic wave, thus providing information beneficial in securing post evidence and responding to electromagnetic waves.

Meanwhile, the above description of the present invention merely discloses detailed embodiments for practicing the technology of the present invention. The present invention may include the technical spirit that is an abstract and conceptual idea that can be utilized as technology in the future, as well as detailed means itself that can be actually used.

What is claimed is:

1. A wideband pulse detector in intentional electromagnetic interference (IEMI) environments, comprising:
    a signal collection unit for receiving electromagnetic pulses causing electromagnetic interference;
    a signal classification unit for classifying the electromagnetic pulses into N channels depending on frequency components corresponding to the electromagnetic pulses, where N is an integer of 2 or more;
    a signal detection unit for detecting and holding the classified pulses; and
    a signal processing unit for converting the held pulses into digital signals, identifying if types of the electromagnetic pulses corresponding to the converted digital signals are narrowband IEMI sources, midband IEMI sources, or wideband IEMI sources using a classification algorithm, and determining strengths of the electromagnetic pulses.

2. The wideband pulse detector of claim 1, wherein the signal collection unit comprises:
    an antenna for receiving the electromagnetic pulses; and
    an equalizer for compensating for a frequency response of the antenna.

3. The wideband pulse detector of claim 1, wherein the signal classification unit comprises:
    a divider for dividing the electromagnetic pulses from the signal collection unit into a signal strength measurement path and a signal identification path;
    N−1 couplers for receiving the electromagnetic pulses from the signal collection unit; and
    filters for receiving respective outputs of the couplers while having different frequency bands.

4. The wideband pulse detector of claim 3, wherein the signal detection unit comprises:
    a first signal detector for receiving outputs of the divider and measuring signal strengths of the outputs; and
    one or more signal detectors for receiving respective outputs of the filters and identifying types of the signals.

5. The wideband pulse detector of claim 1, wherein the signal detection unit comprises signal detectors corresponding to N channels,
    wherein each of the signal detectors comprises:
    an envelope detector for detecting a corresponding electromagnetic pulse; and
    a peak-holding circuit for holding a signal output from the envelope detector.

6. The wideband pulse detector of claim 5, wherein each of the signal detectors further comprises a successive signal detection circuit for resetting an output of the peak-holding hold circuit to a ground under control of the signal processing unit.

7. The wideband pulse detector of claim 5, further comprising a dynamic range compensation and equipment protection circuit for connecting an attenuator to a corresponding signal detector under control of the signal processing unit.

8. The wideband pulse detector of claim 5, further comprising a self-diagnosis circuit for determining whether a corresponding signal detector fails or is operated normally under control of the signal processing unit.

9. The wideband pulse detector of claim 1, further comprising a signal display unit for displaying the types of the electromagnetic pulses identified by the signal processing unit and strengths of the electromagnetic pulses.

10. The wideband pulse detector of claim 1, further comprising a power supply unit for rectifying power and supplying the rectified power to the signal classification unit, the signal detection unit, and the signal processing unit.

11. A method for operating a wideband pulse detector in intentional electromagnetic interference (IEMI) environments, the method comprising:
    detecting, by an envelope detector, a signal received from a corresponding one of filters for respective frequency bands;
    holding, by a peak-holding circuit, the signal detected by the envelope detector to perform digital sampling;
    resetting, by a successive signal detection circuit, the held signal to a ground to thereby have the envelope detector prepare for detection of a successive signal subsequent to the signal;
    converting the held signal into a digital signal; and
    identifying if a type of an electromagnetic pulse corresponding to the converted digital signal is a narrowband IEMI source, a midband IEMI source, or a wideband IEMI source, and determining a strength of the electromagnetic pulse.

12. The method of claim 11, wherein holding the detected signal comprises:
    holding, by the peak-holding circuit, the maximum voltage of the detected signal.

13. The method of claim 11, further comprising:
    receiving an electromagnetic pulse through an antenna; and
    equalizing the received electromagnetic pulse.

14. The method of claim 13, further comprising filtering the equalized pulse for each frequency band.

15. A wideband pulse detector comprising:
    a signal collection unit for receiving electromagnetic pulses;
    a signal classification unit for classifying the electromagnetic pulses into N channels depending on frequency components corresponding to the electromagnetic pulses, where N is an integer of 2 or more;
    a signal detection unit for detecting and holding the classified pulses;
    a signal processing unit for converting the held pulses into digital signals, identifying types of the electromagnetic pulses corresponding to the converted digital signals using a classification algorithm, and determining strengths of the electromagnetic pulses and
    a dynamic range compensation and equipment protection circuit for connecting an attenuator to a corresponding signal detector under control of the signal processing unit.

* * * * *